(12) United States Patent
Thornbury et al.

(10) Patent No.: US 9,680,844 B2
(45) Date of Patent: Jun. 13, 2017

(54) AUTOMATION OF COLLECTION OF FORENSIC EVIDENCE

(71) Applicant: BANK OF AMERICA CORPORATION, Charlotte, NC (US)

(72) Inventors: Thomas Thornbury, Morganville, NJ (US); Mark Allen Brock, Simi Valley, CA (US); John Daron Redmon, Burbank, CA (US); Jeffrey Wayne Texada, Carrollton, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 70 days.

(21) Appl. No.: 14/792,185

(22) Filed: Jul. 6, 2015

(65) Prior Publication Data

US 2017/0012998 A1 Jan. 12, 2017

(51) Int. Cl.
*H04L 29/06* (2006.01)
*G06Q 50/18* (2012.01)

(52) U.S. Cl.
CPC ......... *H04L 63/1408* (2013.01); *G06Q 50/18* (2013.01); *H04L 63/30* (2013.01)

(58) Field of Classification Search
CPC ... H04L 63/1408; H04L 63/30; H04L 63/308; G06F 21/552; G06F 21/577; G06F 2209/549; G06Q 50/18; G06Q 10/00
See application file for complete search history.

(56) References Cited

U.S. PATENT DOCUMENTS

| 7,267,457 | B2 | 9/2007 | Ostler et al. |
| 7,496,959 | B2 | 2/2009 | Adelstein et al. |
| 7,603,344 | B2 | 10/2009 | Bousquet et al. |
| 7,668,205 | B2 | 2/2010 | Putnam |
| 7,809,686 | B2 * | 10/2010 | McCreight ........ G06F 17/30864 707/647 |
| 7,849,443 | B2 | 12/2010 | Clemm et al. |
| 7,971,179 | B2 | 6/2011 | Venolia |
| 8,176,557 | B2 | 5/2012 | Adelstein et al. |
| 8,219,588 | B2 | 7/2012 | Bousquet et al. |
| 8,259,938 | B2 | 9/2012 | Petrovic et al. |
| 8,280,905 | B2 | 10/2012 | Shields et al. |

(Continued)

OTHER PUBLICATIONS

EnCase Forensic User Manual—Version 5, Guidance Software, 2006.*

(Continued)

*Primary Examiner* — Minh Dinh
(74) *Attorney, Agent, or Firm* — Michael A. Springs; Moore & Van Allen PLLC; James C. Edwards (57) ABSTRACT

Embodiments of the invention are directed to systems, methods and computer program products for automated collection of user-specified forensic data from a target computer associated with a case. In particular, embodiments herein disclosed provide for a system that is configured to provide a user interface to allow a user to select a target computer within a network, select one or more user profiles associated with the target computer, and specify one or more types of forensic data to be collected from the target computer. The system is also configured to create a subfolder in a folder linked to the case and one or more files in the subfolder for storing the user-specified data; connect the computer apparatus to the target computer; and collect the specified data and save the collected data to the files.

22 Claims, 3 Drawing Sheets

(56) References Cited

U.S. PATENT DOCUMENTS

| | | |
|---|---|---|
| 8,290,202 B2 | 10/2012 | Carr et al. |
| 8,312,023 B2 | 11/2012 | Shields et al. |
| 8,346,567 B2 | 1/2013 | Petrovic et al. |
| 8,364,681 B2* | 1/2013 | Richards ............... G06Q 10/06 707/641 |
| 8,417,776 B2 | 4/2013 | Womack et al. |
| 8,424,094 B2 | 4/2013 | Neystadt et al. |
| 8,438,174 B2 | 5/2013 | Shields et al. |
| 8,474,047 B2 | 6/2013 | Adelstein et al. |
| 8,549,307 B2 | 10/2013 | Winograd |
| 8,566,903 B2 | 10/2013 | Kisin et al. |
| 8,656,095 B2* | 2/2014 | Coulter ................. G06Q 10/00 711/112 |
| 8,681,978 B2 | 3/2014 | Petriovic et al. |
| 8,745,100 B2 | 6/2014 | Kim et al. |
| 8,832,148 B2 | 9/2014 | Kisin et al. |
| 8,881,271 B2 | 11/2014 | Butler, II |
| 8,931,107 B1 | 1/2015 | Brandwine |
| 2003/0208689 A1 | 11/2003 | Garza |
| 2004/0260733 A1* | 12/2004 | Adelstein ............... H04L 63/123 |
| 2007/0283158 A1 | 12/2007 | Danseglio |
| 2008/0065811 A1 | 3/2008 | Jahangiri |
| 2009/0164522 A1* | 6/2009 | Fahey ..................... H04L 63/30 |
| 2010/0030786 A1 | 2/2010 | McConnell |
| 2010/0030996 A1* | 2/2010 | Butler, II ............... G06F 21/577 711/200 |
| 2010/0299430 A1* | 11/2010 | Powers ............... H04L 12/2809 709/224 |
| 2011/0047130 A1 | 2/2011 | Kim et al. |
| 2011/0055590 A1 | 3/2011 | Lee et al. |

OTHER PUBLICATIONS

EnCase Enterprise for Corporation, Guidance Software, 2006.*
Cohen et al., Distributed forensic and incident response in the enterprise, Elsevier, 2011.*

* cited by examiner

AUTOMATION OF COLLECTION OF FORENSIC EVIDENCE

BACKGROUND

Forensics commonly refers to the scientific methods of collecting and examining information or forensic data that can be used as a source of evidence in a legal or an administrative proceeding, for example, an audit, a regulatory investigation, a civil or criminal investigation, or internal investigations of employee wrongdoing. An essential part of forensic technology is automation of collection of forensic data from a target computer of which at least one of the users is a suspect in a case under investigation. Historically, collecting forensic data from a target computer requires capturing the whole hard drive of the computer, which obviously takes a great deal of storage capacity on a system managing the data; especially when same or similar data from a target computer has to be acquired frequently, for example, on a daily or weekly basis, the growth of the collected data and space demanded for storing such data can be substantial.

SUMMARY

Some embodiments characterize a system, which includes the following: a computer apparatus having at least one processor and memory in communication with the processor; and a software module stored in the memory, executable by the processor and configured to: initiate a case; provide a user interface to allow a user to select a target computer within a network, select one or more user profiles associated with the target computer, and specify one or more types of forensic data to be collected from the target computer; create at least one subfolder in a folder linked to the case and one or more files in the subfolder for storing the specified forensic data; connect the computer apparatus to the target computer and scan the target computer to determine the Operating System (OS) thereof; and collect the forensic specified data and save the collected data to the files.

Some embodiments feature a method, which includes the steps of: initiating a case; providing a user interface to allow a user to select a target computer within a network, select one or more user profiles associated with the target computer, and specify one or more types of forensic data to be collected from the target computer; creating at least one subfolder in a folder linked to the case and one or more files in the subfolder for storing the specified forensic data; connecting the computer apparatus to the target computer and scanning the target computer to determine the OS thereof; and collecting the specified forensic data and saving the collected data to the files.

Further embodiments provide a computer program product, which includes a non-transitory computer-readable medium having one or more computer-readable programs stored therein, and the computer-readable programs, when executed by a computer apparatus, cause the computer apparatus to perform the following steps: providing a user interface to allow a user to select a target computer within a network, select one or more user profiles associated with the target computer, and specify one or more types of forensic data to be collected from the target computer; creating at least one subfolder in a folder linked to the case and one or more files in the subfolder for storing the specified forensic data; connecting the computer apparatus to the target computer and scanning the target computer to determine the OS thereof; and collecting the specified forensic data and saving the collected data to the files.

Implementations may include one or more of the following features.

In some implementations, the case is a new or an existing case, in which forensic data is sought, located, collected and searched for a purpose of using the forensic data as evidence in a legal proceeding, an audit, a regulatory investigation, a civil or criminal investigation, or internal investigations of employee wrongdoing.

In some implementations, the target computer is selected by entering into the user interface the Internet Protocol (IP) address or computer name of the target computer.

In some implementations, the subfolder is created on the computer apparatus or on a computer-readable medium.

In some implementations, the filename of the created files includes the entered IP address or computer name and a timestamp that the software module is being run.

In some implementations, the forensic data includes Windows data including log files, page files, registry hives, event logs, application data, antivirus files, a recycle bin and link files.

In some implementations, the forensic data includes user profile data including, files in Desktop and Documents folders, emails, contact lists and Internet browsing history.

In some implementations, the forensic data includes a full image of Random Access Memory (RAM).

In some implementations, the forensic data includes boot records including a Master Boot Record (MBR) and Globally unique identifiers Partition Table (GPT).

In some implementations, at least one of the created files is a logical evidence file (LEF).

In some implementations, the software module is further configured to scan one or more hard drives on the target computer to identify at least one logical volume and mount the identified logical volume.

In some implementations, the software module is further configured to output collection status to a console and to an acquisition log, wherein the acquisition log is saved in the subfolder.

In some implementations, initiating a case includes creating a new case or opening an existing case.

In some implementations, selecting the target computer includes entering into the user interface the IP address or computer name of the target computer.

In some implementations, specifying the data includes specifying Windows data including log files, page files, registry keys, event logs, application data, antivirus files, a recycle bin and link files.

In some implementations, specifying the data includes specifying user profile data including one or more email exchange servers, files in Desktop and Documents folders, emails, contact lists and Internet browsing history.

In some implementations, specifying the data includes specifying one or memory files including a full image of RAM.

In some implementations, specifying the data includes specifying boot records including a MBR and GPT.

In some implementations, saving the collected data includes writing the collected data to a LEF.

In some implementations, the method further includes scanning one or more hard drives on the target computer to identify at least one logical volume and mounting the identified logical volume.

In some implementations, the method further includes outputting collection status to a console and to an acquisition log, wherein the acquisition log is saved in the subfolder.

In some implementations, the computer-readable medium includes a Digital Versatile Disk (DVD), Compact Disk (CD), flash memory stick, and the like.

Other implementations, features and advantages are in the description, drawings and claims.

BRIEF DESCRIPTION OF THE DRAWINGS

Having thus described embodiments of the invention in general terms, reference may now be made to the accompanying drawings:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As may be appreciated by one of skill in the art, the present invention may be embodied as a method, system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a RAM, a read-only memory (ROM), an erasable programmable read-only memory (EPROM or Flash memory), a compact disc read-only memory (CD-ROM), or other optical or magnetic storage device; or transmission media such as those supporting the Internet, an intranet, or a wireless network. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, the scripting language associated with Guidance Software's Encase product, or the like. However, the computer program code for carrying out operations of embodiments of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Embodiments of the present invention are directed to systems, methods and computer program products for automated collection of user-specified forensic data from a target computer associated with a case. As aforenoted, historically, collecting forensic data from a target computer requires capturing the whole hard drive of the computer, which takes a great deal of storage capacity on a system managing the data; especially when same or similar data from a target computer has to be acquired frequently, for example, on a daily or weekly basis, the growth of the collected data and space demanded for storing such data can be substantial. Some embodiments arise, in part, from the realization that a system and process can advantageously be configured to automatically collect user-specified forensic data from a target computer associated with a case. Such embodiments provide a user interface to allow a user to select a target computer within a network, select one or more user profiles associated with the target computer, and specify one or more types of forensic data to be collected from the target computer. Such embodiments further create at least one subfolder linked to the case and one or more files therein for storing the specified forensic data, connect a server computer to the target computer and collect the specified data and save the collected data to the files. As such, the present invention significantly reduces the storage space on a system managing the forensic data and ease the corresponding administrative work.

Figure 1:
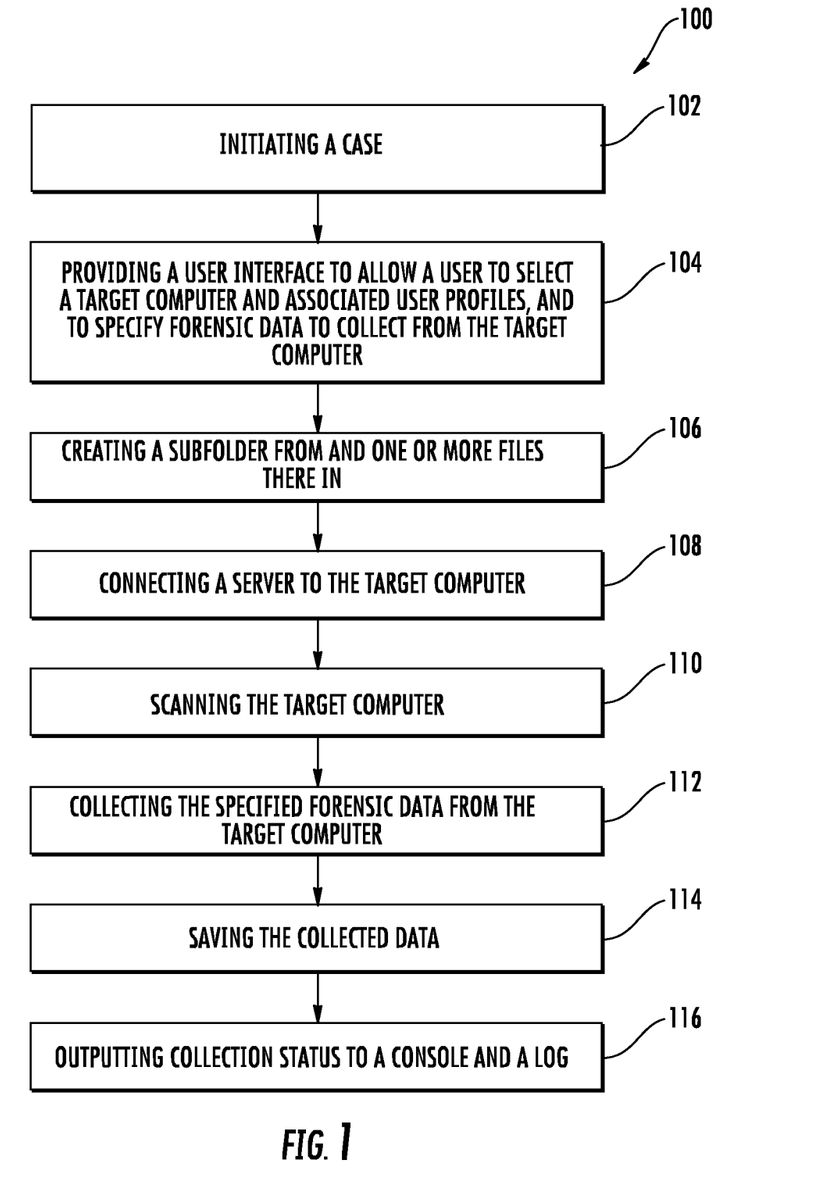
FIG. 1 is a flowchart illustrating a general process for automated collection of user-specified forensic data, in accordance with an embodiment of the present invention.

FIG. 1 illustrates a general process flow 100 for automated collection of user-specified forensic data from a target computer associated with a case, in accordance with embodiments of the present invention. The process 100 includes multiple steps and can be executed by a system in a system environment, for example, by the server 210 in the system environment 200 of FIG. 2. As used herein, the terms "server" and "system" are interchangeable. A "server" can include a personal computer, a mainframe computer, any suitable informatics system and/or the like. A "system environment" can be an information technology (IT) platform of an enterprise or a business entity, for example, a national or multi-national corporation, and can include a multitude of servers, machines, computers and network devices in communication with one another over a communication network.

As shown in FIG. 1, the process 100, include the steps of: initiating (102) a case; providing (104) a user interface to allow a user to select a target computer within a network, select one or more user profiles associated with the target computer, and specify one or more types of forensic data to be collected from the target computer. The method 100 also includes the step of creating (106) at least one subfolder in a folder linked to the case and one or more files in the subfolder for storing the specified forensic data. At least one of the created files is a LEF for storing logical data, e.g., Windows data and user profile data. The subfolder and one or more files can be created on a server computer or on a computer readable medium that can be accessed by a server. The process 100 further includes connecting (108) a server computer to the target computer and scanning (110) the target computer to determine the OS thereof; collecting (112) the specified forensic data and saving (114) the collected data to the one or more files; and outputting (116) collection status to a console and an acquisition log, wherein the acquisition log is saved in the subfolder.

A case may arise out of a legal or an administrative proceeding, for example, an audit, a regulatory examination, a civil or criminal investigation, or internal investigations of employee wrongdoing. The term "investigation," as used herein, may refer to any of legal or administrative proceedings above mentioned. A case can be initiated by creating a new case or by opening an existing one, in which forensic data is sought, located, collected and searched for a purpose of using the forensic data as evidence in an investigation. In some embodiments, a case can be initiated by a user manually or automatically through running a software program stored on a server that is configured to execute the process 100. A "user," as used herein, refers to any person who is involved in investigating or administrating a case, such as an investigator or investigation agency. The process 100 can be executed by the server operated and controlled by the user.

Upon initiation of a case, the process 100 progresses to providing (104) a user interface, which allows a user to select a target computer in a network, select one or more user profiles associated with the target computer, and specify one or more types of forensic data to be collected from the target computer. In some embodiments, a target computer can be selected by entering into the user interface the IP address or computer name of the target computer. An IP address is a numerical value or network interface identification assigned to a network device, e.g., a network computer. A computer name can include a domain name, if the computer is participating in a domain of a network.

In some embodiments, the user profiles associated with the target computer can be selected by entering into the user interface the name of the user profiles. The user profiles may include one or more network user identifications, each network user identification is associated with a user of the target computer, and log-on data associated with the target computer, including a date and time each user last logged on to the computer and a number of log on occurrences for each user over a predetermined period of time.

Once a target computer and associated user profiles are selected, the user can specify one or more types of forensic data, displayed in the user interface, to collect from the target computer. In some embodiments, data of all types can be treated as forensic evidence and has to be collected from a target computer, including text, documents, images, emails, calendar events, databases, spreadsheets, application data, multimedia files, web sites, computer programs, etc. In some embodiments, only certain types of data may be relevant to an investigation and necessary to acquire from a target computer.

The types of data displayed in the user interface may include Windows data, if the target computer runs Windows OS, which may include log files, page files, registry hives, event logs, application data, antivirus files, recycle bin, link files and the like. Other types of data displayed in the user interface can include user profile data, which may include files in the desktop and documents folders, emails, contact lists and Internet browsing history; one or more memory files, which may include a full image of RAM; and boot records, which may include a MBR and GPT. A RAM is a type of computer memory that can be accessed randomly at runtime. An MBR holds the information such as how and where an OS is located, how the logical partitions, including file systems, are organized on the partitioned media. A GPT is a relatively new partitioning scheme, compared with MBR and can coexist with a MBR in order to provide some limited form of backward compatibility for older systems.

Once the types of forensic data are specified by the user, the process 100 progresses to creating (106) at least one subfolder in a folder linked to a case and one or more files in the subfolder for storing the specified forensic data. The subfolder and the files can be created on a server computer or on a computer readable medium that can be accessed by the server, such as a Digital Versatile Disk (DVD), Compact Disk (CD), flash memory stick, and the like. The subfolder and files can be created by the user manually or automatically through running a software module stored on a server that is configured to execute the process 100. In some embodiments, the filename of the created files may include the IP address or computer name of the target computer and a timestamp that the process 100 being executed or that the software module is being run, if the files are created through a software module on a server.

Upon creation of the subfolder and the files, the process 100 advances to connecting (108) a server computer to the target computer and scanning (110) the target computer to determine the OS thereof. Depending on what OS the target computer runs, the types of data displayed in the user interface may vary. For example, if the target computer runs Windows OS, then the data displayed in the user interface may include Windows data. After the OS is identified, the process 100 proceeds by scanning one or more hard drives on the target computer to identify at least one logical volume and mounting the identified logical volume. A logical volume is where the logical evidence resides, e.g., flat or hierarchical file systems.

The process 100 then advances to collecting (112) the specified forensic data and saving (114) the collected data to the one or more files in the subfolder. In some embodiments, different types of data can be saved to different files, for example, including at least one LEF.

While collecting (112) and saving (114) the specified forensic data from the target computer, the process 100 is outputting (116) collection status to a console. The step of outputting (116) collection status is synchronized with the steps of collecting (112) and saving (114), that is, the step outputting (116) occurs in real-time or near real-time, so that the user can monitor the collection status with the live display on the console. The collection status is also written to an acquisition log, which is saved in the subfolder. The acquisition log can be used as evidence as well in a legal proceeding, since it provides information, such as how the data was being collected and what occurred during collecting the data. If in any case the process of collecting the data is interrupted, e.g., by Internet traffic or disconnection of the server from the target computer, the output of collection status can help the user to decide where to continue or re-run the process.

Figure 2:
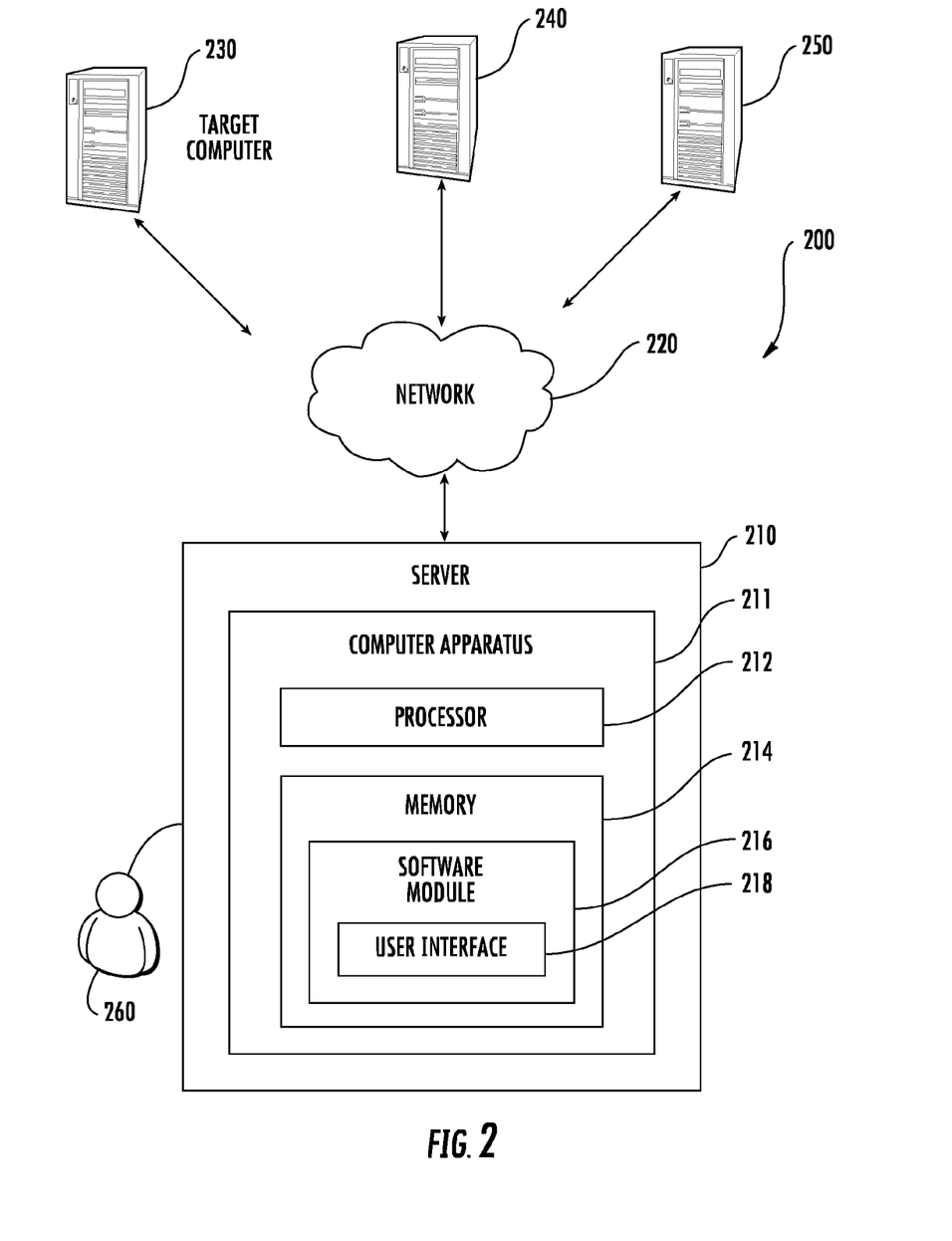
FIG. 2 is a block diagram illustrating a system environment for implementing the process flow described in FIG. 1, in accordance with an embodiment of the invention.

Referring now to FIG. 2, a block diagram of a system environment 200 is provided, for executing the process flow 100 described in FIG. 1, in accordance with an embodiment of the present invention. The system environment 200 includes a server 210, a network 220, multiple computers 230, 240, 250, in communication with the server 210, via the network 220, and a user 260, interacting with the server 210, e.g., to run a software module therein.

As previously noted, the system environment 200 can be an IT platform of an enterprise or a business entity, for example, a national or multi-national corporation, and can include a multitude of servers, machines, computers and network devices in communication with one another over a communication network. The server 210, as shown in FIG. 2, includes a computer apparatus 211 that includes at least one processor 212, a memory 214 in communication with the processor 212, and a software module 216 stored in the memory 214, which includes program codes for a user interface 218.

The server 210 can include any server and/or apparatus described and/or contemplated herein. Additionally or alternatively, the server 210 can be configured to initiate, perform, complete, and/or facilitate any portion of any embodiment described and/or contemplated herein as being initiated, performed, completed, and/or facilitated by a server and/or apparatus. In some embodiments, the server 210 includes one or more servers, engines, mainframes, personal computers, network devices, front end systems, back end systems, database systems, any suitable informatics systems and/or the like. The server 210 can be managed by an enterprise or a business entity and located at a facility associated with the entity or remotely from a facility associated with the entity.

The processor 212 includes circuitry for implementing the functions of the server 210. For example, the processor 212 can include a digital signal processor device, a microprocessor device, and various analog-to-digital converters, digital-to-analog converters, and other support circuits. Control and signal processing functions of the server 210 in which the processor 212 resides may be allocated between these devices according to their respective capabilities. The processor 212 also includes functionality to operate one or more software programs based on computer-executable program code portions thereof, which may be stored, along with the software module 216, in the memory 214 of the server 210.

The memory 214, as described herein for storing the software module 108 and other information, may include any computer-readable medium. For example, the memory 214 may include volatile memory, such as RAM having a cache area for the temporary storage of information. The memory 214 may also include nonvolatile memory that may be embedded and/or removable. The non-volatile memory may additionally or alternatively include an Electrically Erasable Programmable Read-Only Memory (EEPROM), flash memory, and/or the like. The memory 214 can store any one or more of pieces of information and data used by the server 210 in which it resides to implement the functions of the server 210.

The user interface 218 is a graphic user interface (GUI), in accordance with an embodiment of the present invention. A GUI is a type of interface that enables a user to interact with electronic devices through direct manipulation of graphical elements on the interface. The graphic elements include, but are not limited to, checkboxes, buttons, radio buttons, dropdown lists, list boxes, text fields and the like.

The computers 230, 240, 250, can be personal computers, electronic notebooks or any computing devices, communicating with the server 210 through the network 220. The software module 216, when executed by the processor 212, first launches the user interface 218, which allows the user 260 to select one of the computers 230, 240, 250, e.g., the computer 230, as a target computer that is associated with a case under investigation. The user interface 218 further allows the user 260 to select one or more user profiles associated with the target computer 230 and to specify one or more types of forensic data to be collected from the target computer 230. The target computer 230 may run any type of Operating System (OS), such as Windows OS, Mac OS, Chrome OA, Linux, or UNIX-type of OS.

The types of forensic data displayed in the user interface include, by way of example but not limited to, Windows data, if the target computer 230 runs Windows, user profile data, memory files and boot records. The options of Windows data that the user 260 can specify include log files, page files, registry keys, event logs, application data, antivirus files, a recycle bin, link files and the like. The user 260 can also specify what user profile data to acquire from the target computer 230, which may include files in Desktop and Documents folders, emails, contact lists and Internet browsing history. The user 260 can further specify a full image of the RAM and boot records, e.g., a MBR and/or GPT, to be collected from the target computer 230.

The collected data can be stored in one or more files in a subfolder linked to a case. The subfolder and the files therein can be created manually or automatically via the software module 216. In some embodiments, the files for storing the collected forensic data may have a filename including the IP address or computer name of the target computer 130 and a timestamp that the software module 216 is being run. At least one of the files for storing the collected data is a LEF.

Figure 3:
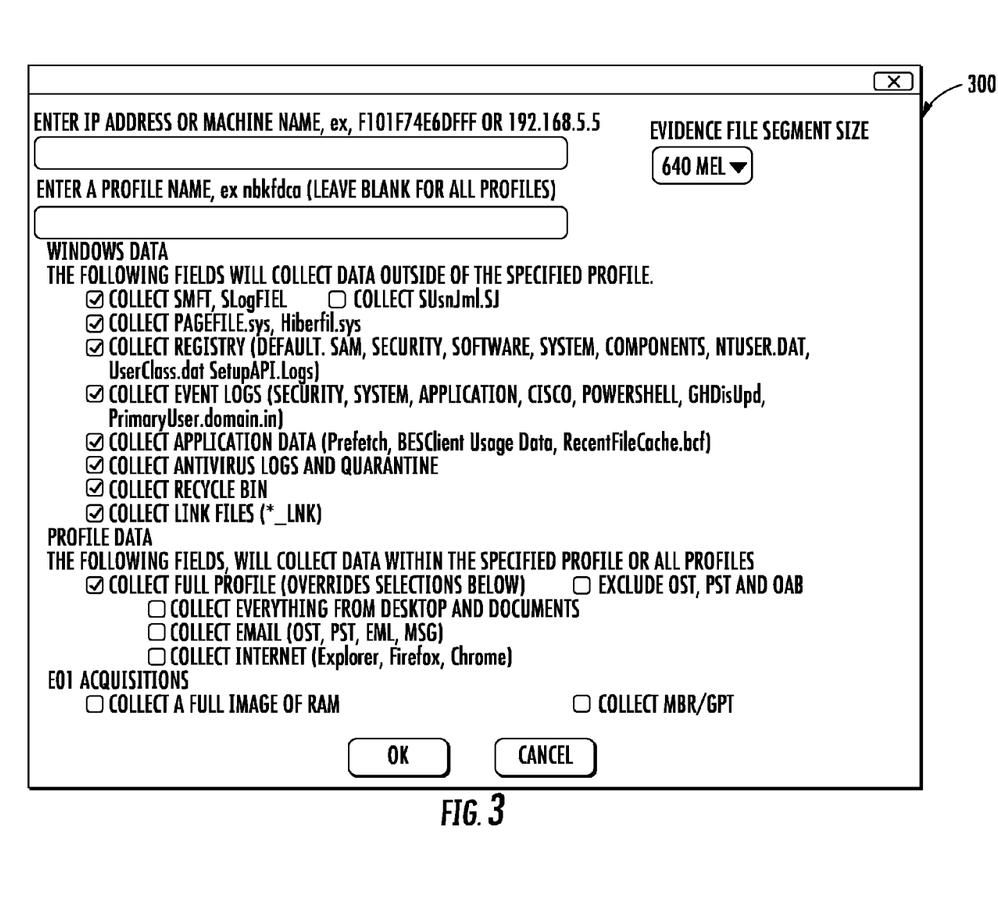
FIG. 3 is an exemplary user interface that allows a user to specify forensic data to be collected from a target computer, in accordance with one embodiment of the present invention.

FIG. 3 is an exemplary user interface 300 that allows a user to select a target computer in an enterprise network by entering the IP address or computer name in a text field and select one or more user profiles on the selected target computer by entering the user profile names in another text field. The user interface 300 also allows the user to specify one or more types of forensic data by clicking the checkboxes ahead of each data type. In this example, all computers in the enterprise network are running Windows OS, and thus Windows data is displayed in the user interface 300 as a data type for the user to select. The user can also specify other types of data to be collected from the selected target computer, for example, user profile data, a full image of RAM, and a MBR or GPT.

As shown in the user interface 300, there are three groups of data on for a user to specify, covering Windows data, profile data and acquisitions. Under Windows data, there is an array of checkboxes corresponding to various Windows data types, including: MFT (Master File Table), LogFile, PageFile.sys, Registry, Event Logs, Application Data, Antivirus Logs and Quarantine, Recycle Bin, Link Files (*.lnk), and so on.

Under Profile data, two checkboxes "Collect Full Profile" and "Exclude OST, PST and OAB" are parallel to each other and three checkboxes are arranged underneath the former. OST (Offline Storage Table) is the local cache of emails, contact, meeting, etc. on a computer and is related specifically to Outlook in Microsoft Office, PST (Personal Storage Table) is an offline storage file for email on a computer and is related specifically to Outlook in Microsoft Office, and OAB (Outlook Address Book) is a collection of address lists created in the Outlook contact folders. The three checkboxes, under the checkbox "Collect Full Profile," are, respectively, 1) "Collect everything from Desktop and Documents," wherein Desktop and Documents are file folders specific to a user of the selected target computer; 2) "Collect Email (OST, PST, EML, MSG)," wherein OST, PST, EML, MSG refer to different email related file types and/or email formats, e.g., EML is an email format that a number of email tools use to store the individual emails and MSG is an email format Microsoft Outlook uses for individual emails; and 3) "Collect Internet (Iexplorer, Firefox, Chrome)," wherein Iexplorer, Firefox, Chrome are different web browsers. If the checkbox "Collect Full Profile" is selected, then selection of the three checkboxes thereunder will be overridden. If the checkbox "Exclude OST, PST and OAB" is selected, then three email related file types, OST, PST and OAB, will be excluded from data collection.

The Acquisitions section has two checkboxes listed, "Collect a full image of RAM" and "Collect MBR/GPT." With the checkbox "Collect a full image of RAM" selected, a full image of the random access memory of the target computer will be captured. With the checkbox "Collect MBR/GPT" specified, the boot records will be retrieved from the target computer.

At the top of the user interface 300, there is a dropdown list "Evidence File Segment Size" for defining a computer readable medium to store the collected data. The dropdown list including multiple items, each indicating a size of a particular physical storage medium, for example, "640 MB" specifying the storage size of a CD and "1.4 GB" a DVD.

Although a number of implementations have been described in detail above, other modifications, variations and implementations are possible in light of the foregoing teaching. For example, though, as illustrated in FIG. 3, the user interface 300 displays Windows data as a type of forensic data for a user to specify, it can display other options specific to other types of OS that a target computer may run, such as Mac OS, Chrome OA, Linux, a UNIX-type of OS, etc. Also, more email formats than the listed in the user interface 300 can be supported.

For example, though, as depicted in FIG. 2, the software module 216 is configured to collect the forensic data from one target computer, it can be configured to collect forensic data from multiple computers simultaneously. The data can also be collected across multiple hard drives and multiple logical volumes on each computer concurrently.

For example, though, as shown in FIG. 3, the types of forensic data are grouped based on types of artifacts, it's contemplated within the scope of the present invention, that forensic data can also be grouped based on types of events, or based on other types known to the skilled in the art.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the disclosure in the form disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated. Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the present disclosure. Thus, although not expressly described, any or each of the features of the invention disclosed herein may be combined in any manner.

Accordingly, the invention is to be defined not by the preceding illustrative description but instead by the scope of the following claims.

What is claimed is:

1. A system for automated collection of user-specified forensic data from a target computer associated with a case, the system comprising:
   a computer apparatus having at least one processor and a memory in communication with the processor; and
   a software module stored in the memory, executable by the processor and configured to:
      initiate a case;
      provide a user interface to allow a user to select a target computer within a network by entering into the user interface the Internet Protocol (IP) address or computer name of the target computer, select one or more user profiles associated with the target computer, and specify one or more types of forensic data to be collected from the target computer;
      create at least one subfolder in a folder linked to the case and one or more files in the subfolder for storing the specified forensic data, wherein the one or more files have a filename that comprises (i) the entered IP address or computer name and (ii) a timestamp associated with a time that the software module is being run;
      connect the computer apparatus to the target computer and scan the target computer to determine the Operating System (OS) thereof; and
      collect the specified forensic data and save the collected data to the files.

2. The system of claim 1, wherein the case is a new or an existing case, in which forensic data is sought, located, collected and searched for a purpose of using the forensic data as evidence in a legal proceeding, an audit, a regulatory investigation, a civil or criminal investigation, or the like.

3. The system of claim 1, wherein the subfolder is created on the computer apparatus or on a computer-readable medium.

4. The system of claim 1, wherein the subfolder and the one or more files are created automatically via the software module.

5. The system of claim 1, wherein the forensic data comprises Windows data comprising log files, page files, registry keys, event logs, application data, antivirus files, a recycle bin and link files.

6. The system of claim 1, wherein the forensic data comprises user profile data comprising one or more email exchange servers, files in Desktop and Documents folders, emails, contact lists and Internet browsing history.

7. The system of claim 1, wherein the forensic data comprises a full image of Random Access Memory (RAM).

8. The system of claim 1, wherein the forensic data comprises boot records comprising a Master Boot Record (MBR) and globally unique identifiers Partition Table (GPT).

9. The system of claim 1, wherein at least one of the created files is a logical evidence file (LEF).

10. The system of claim 1, wherein the software module is further configured to scan one or more hard drives on the target computer to identify at least one logical volume and mount the identified logical volume.

11. The system of claim 1, wherein the software module is further configured to output collection status to a console and to an acquisition log, wherein the acquisition log is saved in the subfolder.

12. A computer-implemented method for automated collection of user-specified forensic data from a target computer associated with a case, the method comprising:
   initiating a case;
   providing a user interface to allow a user to select a target computer within a network by entering into the user interface the Internet Protocol (IP) address or computer name of the target computer, select one or more user profiles associated with the target computer, and specify one or more types of forensic data to be collected from the target computer;
   creating at least one subfolder in a folder linked to the case, on the computer apparatus or a computer-readable medium, and one or more files in the subfolder for storing the specified forensic data, wherein the one or more files have a filename that comprises (i) the entered IP address or computer name and (ii) a timestamp associated with a time that the software module is being run;
   connecting the computer apparatus to the target computer and scanning the target computer to determine the OS thereof; and
   collecting the specified forensic data and saving the collected data to the files.

13. The method of claim 12, wherein initiating a case comprises creating a new case or opening an existing case, in which forensic data is sought, located, collected and searched for a purpose of using the forensic data as evidence in a legal proceeding, an audit, a regulatory investigation, a civil or criminal investigation, or the like.

14. The method of claim 12, wherein specifying the data comprises specifying Windows data comprising log files, page files, registry keys, event logs, application data, antivirus files, a recycle bin and link files.

15. The method of claim 12, wherein specifying the data comprises specifying user profile data comprising one or more email exchange servers, files in Desktop and Documents folders, emails, contact lists and Internet browsing history.

16. The method of claim 12, wherein specifying the data comprises specifying one or memory files comprising a full image of RAM.

17. The method of claim 12, wherein specifying the data comprises specifying boot records comprising a MBR and GPT.

18. The method of claim 12, wherein saving the collected data comprises writing the collected data to a LEF.

19. The method of claim 12 further comprising scanning one or more hard drives on the target computer to identify at least one logical volume and mounting the identified logical volume.

20. The method of claim 12 further comprising outputting collection status to a console and to an acquisition log, wherein the acquisition log is saved in the subfolder.

21. A computer program product for automated collection of user-specified forensic data from a target computer associated with a case, the computer program product comprising a non-transitory computer-readable medium having one or more computer-readable programs stored therein, and the computer-readable programs, when executed by a computer apparatus, cause the computer apparatus to perform the following steps:

providing a user interface to allow a user to select a target computer within a network by entering into the user interface the Internet Protocol (IP) address or computer name of the target computer, select one or more user profiles associated with the target computer, and specify one or more types of forensic data to be collected from the target computer;

creating at least one subfolder in a folder linked to the case, on the computer apparatus or a computer-readable medium, and one or more files in the subfolder for storing the specified forensic data, wherein the one or more files have a filename that comprises (i) the entered IP address or computer name and (ii) a timestamp associated with a time that the software module is being run;

connecting the computer apparatus to the target computer and scanning the target computer to determine the OS thereof; and     collecting the specified forensic data and saving the collected data to the files.

22. The computer program product of claim 21, wherein the computer-readable medium comprises a Digital Versatile Disk (DVD), Compact Disk (CD), flash memory stick, and the like.

\* \* \* \* \*